US012119551B2

(12) United States Patent
Lipowski et al.

(10) Patent No.: US 12,119,551 B2
(45) Date of Patent: Oct. 15, 2024

(54) HIGH FREQUENCY AGGREGATION NODE WITH SWAPPABLE LENSES

(71) Applicant: Starry, Inc., Boston, MA (US)

(72) Inventors: Joseph Thaddeus Lipowski, Norwell, MA (US); Volkan Efe, Belmont, MA (US); Lyda T. Sallaway, Berkley, MA (US); Peter M. Nielsen, Brookline, MA (US)

(73) Assignee: Starry, Inc., Boston, MA (US)

( * ) Notice: Subject to any disclaimer, the term of this patent is extended or adjusted under 35 U.S.C. 154(b) by 0 days.

(21) Appl. No.: 17/443,053

(22) Filed: Jul. 20, 2021

(65) Prior Publication Data

US 2022/0029303 A1 Jan. 27, 2022

Related U.S. Application Data

(60) Provisional application No. 63/054,485, filed on Jul. 21, 2020.

(51) Int. Cl.
*H01Q 19/06* (2006.01)
*H01Q 3/30* (2006.01)

(52) U.S. Cl.
CPC ............... *H01Q 19/06* (2013.01); *H01Q 3/30* (2013.01)

(58) Field of Classification Search
CPC ........ H01Q 1/12; H01Q 1/1207; H01Q 1/125; H01Q 1/1264; H01Q 1/18; H01Q 1/20; H01Q 1/22; H01Q 1/241; H01Q 1/246; H01Q 3/30; H01Q 15/0006; H01Q 15/02; H01Q 19/06; H01Q 19/062; H01Q 3/46; H01Q 15/08
See application file for complete search history.

(56) References Cited

U.S. PATENT DOCUMENTS 6,072,437 A * 6/2000 Zimmerman .......... H01Q 1/246 343/753
2014/0077995 A1* 3/2014 Artemenko .............. H01Q 3/24 343/754

(Continued)

FOREIGN PATENT DOCUMENTS

CN 206272627 U * 6/2017
DE 4412770 A1 * 10/1995 ............. G01S 7/032

(Continued)

OTHER PUBLICATIONS

D. Zhu, X. Wu, C. Hua and J. Zhou, "MM-wave cylindrical dielectric lens antenna for full azimuth scanning coverage," 2011 China-Japan Joint Microwave Conference, Hangzhou, China, 2011, pp. 1-4. (Year: 2011).*
P. Wenig, R. Weigel and M. Schneider, "A dielectric lens antenna for digital beamforming and superresolution DOA estimation in 77 GHz automotive radar," 2008 International ITG Workshop on Smart Antennas, Darmstadt, Germany, 2008, pp. 184-189, doi: 10.1109/WSA.2008.4475557. (Year: 2008).*

(Continued)

*Primary Examiner* — Dameon E Levi
*Assistant Examiner* — Leah Rosenberg
(74) *Attorney, Agent, or Firm* — HoustonHogle LLP

(57) ABSTRACT

A high frequency data network access system includes an aggregation node comprising at least one phased array antenna and a changeable lens for the antenna to modify its sweep arc. The lenses preferably have a continuous cross section along a vertical axis. A mounting system can also be used for mounting the lens over phased array antenna. The mounting system can comprise a housing piece and a retaining ring for holding the lens over phased array antenna.

17 Claims, 8 Drawing Sheets

(56) References Cited

U.S. PATENT DOCUMENTS

| | | | | |
|---|---|---|---|---|
| 2016/0087344 | A1* | 3/2016 | Artemenko | H01Q 21/29 343/753 |
| 2017/0077601 | A1* | 3/2017 | Linkies | H01Q 1/50 |
| 2017/0214448 | A1 | 7/2017 | Lipowski et al. | |
| 2017/0271762 | A1 | 9/2017 | Ko et al. | |
| 2018/0164430 | A1* | 6/2018 | Kuriyama | H01Q 13/04 |
| 2020/0091607 | A1* | 3/2020 | Black | H01Q 15/0066 |
| 2020/0212588 | A1 | 7/2020 | Rofougaran et al. | |
| 2020/0212590 | A1* | 7/2020 | Rofougaran | H01Q 21/065 |
| 2020/0364187 | A1* | 11/2020 | Tran | H04B 7/0413 |

FOREIGN PATENT DOCUMENTS

| | | | | |
|---|---|---|---|---|
| DE | 19703095 | C1 * | 6/1998 | H01Q 1/088 |
| EP | 2 360 785 | A1 | 8/2011 | |

OTHER PUBLICATIONS

International Search Report and Written Opinion of the International Searching Authority, mailed on Oct. 7, 2021, from International Application No. PCT/US2021/070907, filed on Jul. 20, 2021. 15 pages.

Luo, Y., et al., "A Scanning Angle Range Enhanced Phase Array Antenna Using Concave-Convex Lens," IEEE International Conference on Service Operations and Logistics, and Informatics (SOLI), 17-20 (2018).

Qu, Z., et al., "Wide-Angle Scanning Lens Fed by Small-Scall Antenna Array for 5G in Millimeter-Wave Band," IEEE Transactions on Antennas and Propagation, 68(5): 3635-3643 (2020).

International Preliminary Report on Patentability, mailed Feb. 2, 2023, from International Application No. PCT/US2021/070907, filed Jul. 20, 2021. 8 Pages.

* cited by examiner

HIGH FREQUENCY AGGREGATION NODE WITH SWAPPABLE LENSES

RELATED APPLICATIONS

This application claims the benefit under 35 USC 119(e) of U.S. Provisional Application No. 63/054,485, filed on Jul. 21, 2020, which is incorporated herein by reference in its entirety.

BACKGROUND OF THE INVENTION

Internet service providers (ISPs) have historically used a number of different technologies in their subscriber or internet access networks to deliver network connectivity to premises such as single family residential homes, multi-dwelling residential units, and businesses. Initially premises were connected via dial-up connections over POTS lines, or ISDN. Often businesses used T-1 to T-3 connections.

Nowadays, DSL, cable and optical fiber networks are common in urban and metropolitan, and even some rural areas to provide network access.

Fixed wireless network access has historically been another option in some areas. Wireless ISPs (or WISPs) provide the wireless network access by transmitting and receiving data to and from endpoint nodes, usually at premises, as radio waves via transmission towers. This has been typically used in rural areas where cable and optical fiber networks are not available.

More recently, WISPs have begun deploying wireless access systems in metropolitan and suburban areas. Their systems generally utilize high frequency wireless data networks, typically operating in the 10 GHz to 300 GHz band, to enable communications between aggregation nodes and one or more high frequency endpoint nodes such as fixed subscriber nodes and/or multi-dwelling unit subscriber nodes, in star-topology networks. One system employs phased arrays at the aggregation nodes.

SUMMARY OF THE INVENTION

Standardization of the aggregation nodes is important to reduce cost and facilitate installation and maintenance. At the same time, different antenna radiation patterns are required for different locations and the optimal antenna radiation patterns can change over time for a given location as the higher densities of subscriber nodes are deployed. To explain more, when designing, deploying, and maintaining aggregation nodes in a wireless access system, it would be cost-effective to use only one or a few aggregation node designs. A given aggregation node design will be limited in the number of endpoint nodes that it can simultaneously support due to data rate limits of its wireless modem chipset(s), and the antenna radiation pattern will be dictated by the node's antenna design. However, the number of subscriber nodes covered by the radiation pattern will be different for different installation locations and for the same location over time as subscriber node densities change as subscribers are added.

The present invention addresses this mismatch between the aggregation node's data rate limits/native radiation pattern and the concomitant number of subscriber nodes covered by that radiation pattern by adding a changeable lens system to the antenna system. This allows the node's radiation pattern to be adapted to the subscriber node density at a given installation location and allows the radiation pattern of a node to be changed in the future as the subscriber node density increases with increased market penetration by the WISP.

In more detail, the current embodiment employs a phased array antenna system in conjunction with digital beamforming to direct the antenna main lobes or beams over a sweep arc that characterizes the azimuthal extent of the antenna system's native radiation pattern. Swappable lenses are then used to narrow or widen its effective sweep arc to match the capacity of the aggregation node. By combining a lens, such as a refractive lens, with a digital beamformer, the effective sweep arc can be modified from the antenna's native sweep arc without losing performance due to not using the entire potential of the digital beamformer. A snap-in lens can allow for quickly swapping in depots or in the field.

In general, according to one aspect, the invention features an aggregation node for an access network. The node has at least one phased array antenna and a changeable lens for the antenna to modify its sweep arc. Different lenses can be selected to increase or decrease its sweep arc over its native arc such as lens with a continuous cross section along a vertical axis. More precisely, the lenses have a continuous cross section along their vertical axis. Often their profile is concave parabolic or convex parabolic, or even a more complex aspheric profile in cross section.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
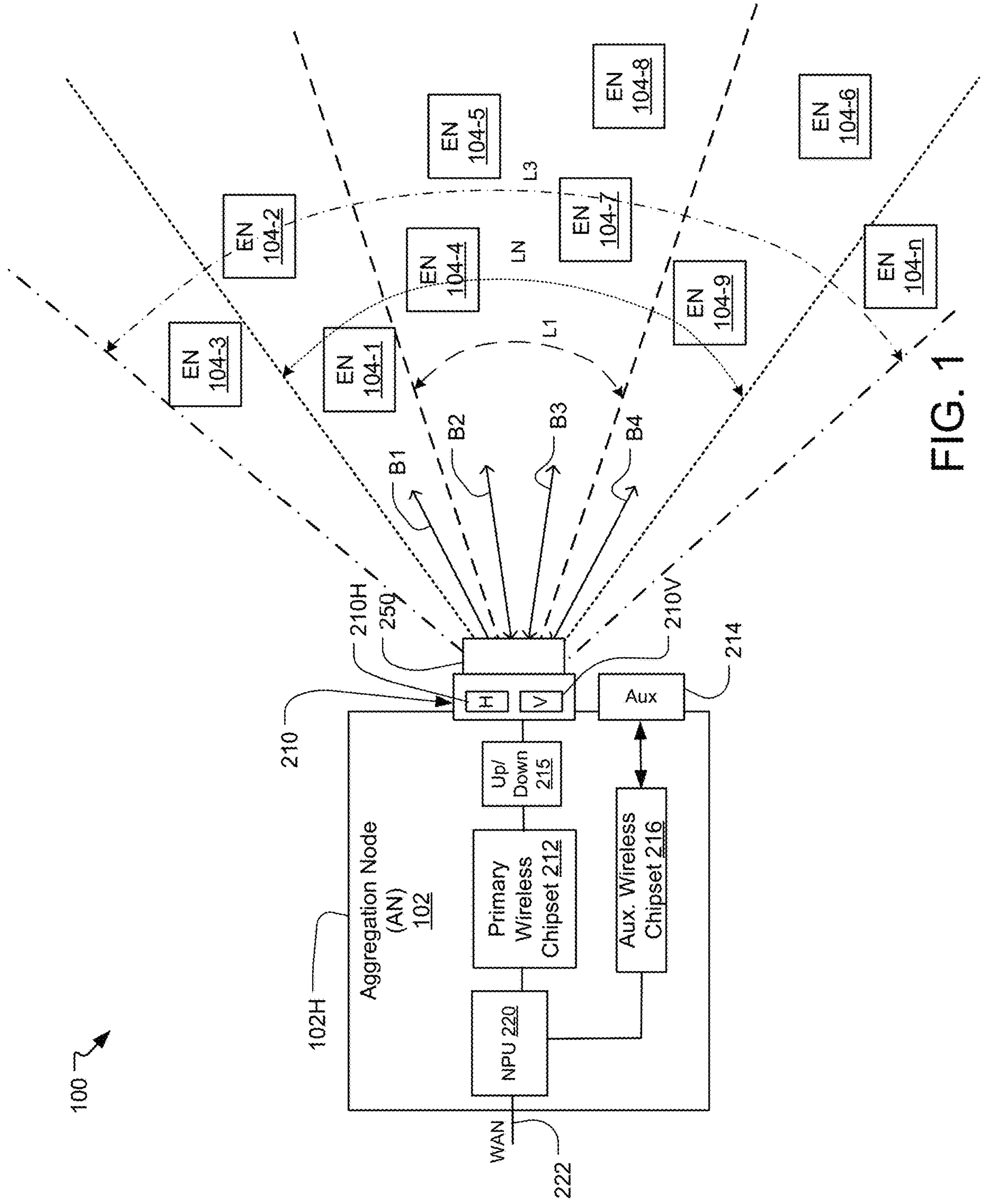
FIG. 1 is a block diagram showing an aggregation node and endpoint nodes in a fixed wireless access system and showing different sweep arcs for different lenses.

FIG. 1 shows a network access system 100, which has been constructed according to the principles of the present invention.

In this system 100, a WISP installs an aggregation node (AN) 102 that communicates with a plurality of high frequency network endpoint or subscriber nodes (EN) 104, e.g., 104-1, 104-2, . . . , and 104-*n*.

The aggregation node 102 preferably utilizes a phased array antenna system 210 to communicate with the endpoint nodes 104-1-104-*m* to form a high frequency network, which preferably operates between 10 and 300 GHz, or more commonly between about 20 and 60 GHz. The antenna system 210 typically covers an azimuthal sweep arc of between about 30 degrees and 180 degrees.

The phased array antenna system 103 forms transmit and receive beams B 1-Bn for downlink and uplink, respectively, communication with each of the endpoint nodes 104-1-104-*m* by executing digital beamforming. In this way, the aggregation node 102 reduces interference between adjacent aggregation nodes, conserves power on the downlinks and reduces transmit power requirements by the endpoint nodes on the uplinks.

Each endpoint node 104 communicates with the aggregation node 102 by means of an electronic assembly or system that provides a wireless ISP (internet service provider) handoff at the premises where the endpoint node 104 is installed.

Locally the endpoint node 104, in a typical residential deployment, communicates with a modem/edge router or access point over possibly a WiFi tunnel (in the 2.4 or 5 GHz bands or the WiGig tri-band in the 2.4, 5 and 60 GHz bands, or IEEE 802.11ac, IEEE 802.11ad-2012) or via a wired connection (e.g., 1000BASE-T or G.hn). This modem/router or access point then maintains the wired and/or wireless local area network at the subscriber's premises. In the case of a multidwelling unit, the endpoint node will typically communicate with multiple modem/edge routers for each of the subscribers in the multidwelling unit.

In other cases, the endpoint node 104 itself maintains the wired and/or wireless LAN at the premises. It provides typical functions associated with LAN routers, such as Network Address Translation (NAT), guest networks, Parental Controls and other Access Restrictions, VPN Server and Client Support, Port Forwarding and UPnP, and DHCP (Dynamic Host Configuration Protocol) server that automatically assigns IP addresses to network devices on the LAN.

According to a preferred embodiment, the aggregation node includes multiple wireless chipsets that encode and decode signals at radio frequencies. Specifically, in the current example, primary wireless chipset 212 communicates via a primary antenna system 210, and an auxiliary wireless chipset 216 communicates via an auxiliary antenna system 214. These chipsets are often commercially available systems of one or more chips. In examples, they implement the IEEE 802.11 standard, i.e., IEEE 802.11ac or 802.11ax. These chipsets are capable of maintaining multiple spatial streams such as provided by the IEEE 802.11ac or 802.11ax versions and follow-on versions of the standard. Each of these WiFi chipsets produces intermediate frequency or WiFi signals, which are signals that have been encoded according to the IEEE 802.11 standard. Any of the traditional WiFi bands can be used such as 900 MHz, 2.4 GHz, 3.6 GHz, 4.9 GHz, 5 GHz, 5.9 GHz.

These intermediate frequency or WiFi signals, typically in the 5-6 GHz band, from the primary wireless chipset 212, are then upconverted to high frequency signals in the 10 and 300 GHz by an up/down convert section 215, or more commonly between about 20 and 60 GHz band, and transmitted to the endpoint nodes 104. In turn, the endpoint nodes transmit high frequency signals back, which signals are downconverted by the converter 215 to intermediate frequency or WiFi signals at the conventional frequencies such as 5-6 GHz band and then decoded by the primary wireless chipset 212.

The auxiliary wireless chipset 216 communicates with the endpoint nodes via auxiliary antenna system 214 at the standard WiFi frequencies such as 5 GHz.

A network processing unit 220 controls the primary wireless chipset 212 and the auxiliary wireless chipset 216 to direct packets received via the wide area network (WAN) link 222 to the endpoint nodes 104 and sends or forwards packets from the endpoint nodes over the WAN link 222.

In general, the network processing unit 220 employs the primary wireless chipset 212 for most communications. However, in the event that the high-frequency link between the aggregation node 102 and a particular endpoint node 104 is impaired, a lower frequency data link is utilized via the auxiliary wireless chipset 216 until the high-frequency link resumes normal operation. A typical reason for such impairment is weather, such as hail or unusually high rainfall, for example.

In the current embodiment, the primary antenna system 210 includes both a horizontal polarization phased array antenna 210H and a vertical polarization phased array antenna 210V. Employing both horizontal and vertical polarization links take maximum advantage of the orthogonality of the channel, thus equivalently doubling the available bandwidth in any given allocated frequency spectrum.

According to the invention, the primary antenna system 210 includes a lens system 250 that is used to modify the primary antenna system's native sweep arc to an effective sweep arc that is chosen to cover the optimal number of endpoint nodes.

In more detail, lens system 250 is preferably a refractive lens and preferably has a concave or convex profile with a continuous cross section along the vertical axis. Thus, in general, the lens system compresses or expands the sweep arc in the azimuth, and leaves it unaltered in elevation.

Different lens profiles are selected based on the desired effective sweep arc. In a specific example, the native sweep arc LN of the primary antenna system 210 is 120 degrees of azimuth. If a narrower effective sweep arc is desired then a plano-concave or plano-convex lens system is selected. On the other hand, if a wider effective sweep arc is desired then a plano-convex lens system is selected. In the illustrated example, arc LN corresponds to the native sweep arc. Arc L1 corresponds to an effective sweep arc when the plano-concave lens system is installed. Whereas arc L3 corresponds to an effective sweep arc when the plano-convex lens system is installed.

Figure 2:
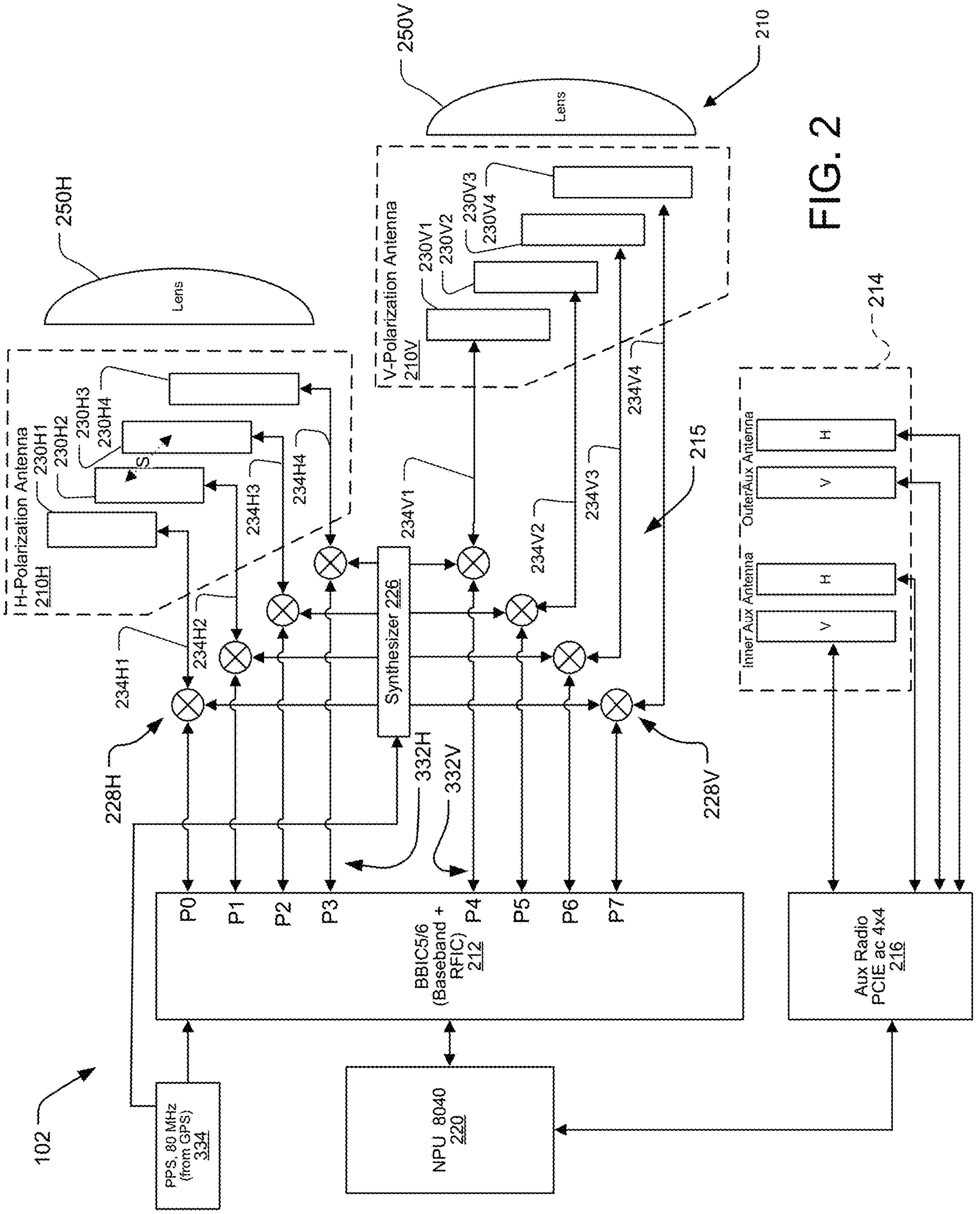
FIG. 2 is a block diagram of the aggregation node.

FIG. 2 shows the details of the aggregation node 102.

In more detail, the primary wireless chipset 212 includes eight send and receive antenna feedlines. Four of those feedlines 332H are used for the horizontal polarization antenna 210H and four feedlines 332V are used for the vertical polarization antenna 210V. In the current embodiment, the primary wireless chipset 212 operates at radio frequencies. Specifically, the feedlines 332H, 332V carry signals that have carrier frequencies of between 5-6 GHz. Up and down frequency conversion for each set of feedlines 332H, 332V is accomplished using a respective set of mixers 228H, 228V, which form part of the up/down convert section 215. The up/down conversion is provided to and from the 10 and 300 GHz band. A current example operates at 37 GHz.

Each of the mixers in each set 228H, 228V receives a local oscillator signal LO generated by a synthesizer 226 which is also part of the convert section 215. This synthesizer generates the local oscillator LO signal based on an 80 MHz GPS signal from a GPS receiver 334.

The four feedlines 234H1-234H4 for the H-polarization antenna 210H terminate at respective four columnar radiating elements 230H1-230H4 of the horizontal polarized antenna 210H. Each of these radiating elements 230H is rectangular extending in the vertical direction. Typically, each of the radiating elements is a set of apertures or patches arranged in a line. Each radiating element will preferably include at least 4 but typically 8 or more apertures or patches. The center-to-center horizontal spacing S between the radiating elements 230H is a function of the wavelength of the transmitted signals. The spacing S is preferably about half the wavelength. Thus, at the current operating frequencies, the spacing S is between 3 millimeters and 5 millimeters.

The same arrangement is used for the feedlines 234V1-234V4 and radiating elements 230V1-230V4 of the vertically polarized antenna 210V.

Each of the individual paths on the transceiver is calibrated during manufacturing or continuously in operation, so that all paths produce equal power at their outputs.

In other examples, the calibrated power to the outer columnar radiating elements is reduced with respect to the inner columnar radiating elements for both antennas 210H, 210V. Specifically, in the context of H-polarization antenna 210H, for example, the power to the two outer elements 230H1 and 230H4 is lower than to the two inner elements 230H2, 230H3. This same arrangement is used for the other antenna 210V. The result is lower side lobe radiation. In one example, this is accomplished by providing less RF transmitter power and less receive gain to the feedlines to the outer elements 230H1 and 230H4.

The primary wireless chipset 212 employs digital beamforming forming beams and thus separate spatial streams to each of the endpoint nodes EN 104 by digitally changing the phase of the signals generated and detected at each of eight antenna pins P0-P7 of the chipset 212.

In a current example, for each polarization (horizontal and vertical), the equivalent beam has a nominal single beamwidth (main lobe) of about 30 degrees, and is scanned over the 120 degree sweep arc if the respective lens 250H, 250V of the lens system 250 has no optical power or is flat or no lens is used. By adding a lens 250H, 250V with optical power, the beamwidth and scan angle can be expanded more using a plano-convex lens or reduced to less with a plano-concave or plano convex lens with respect to the system without a lens, without requiring other changes.

Figure 3A:
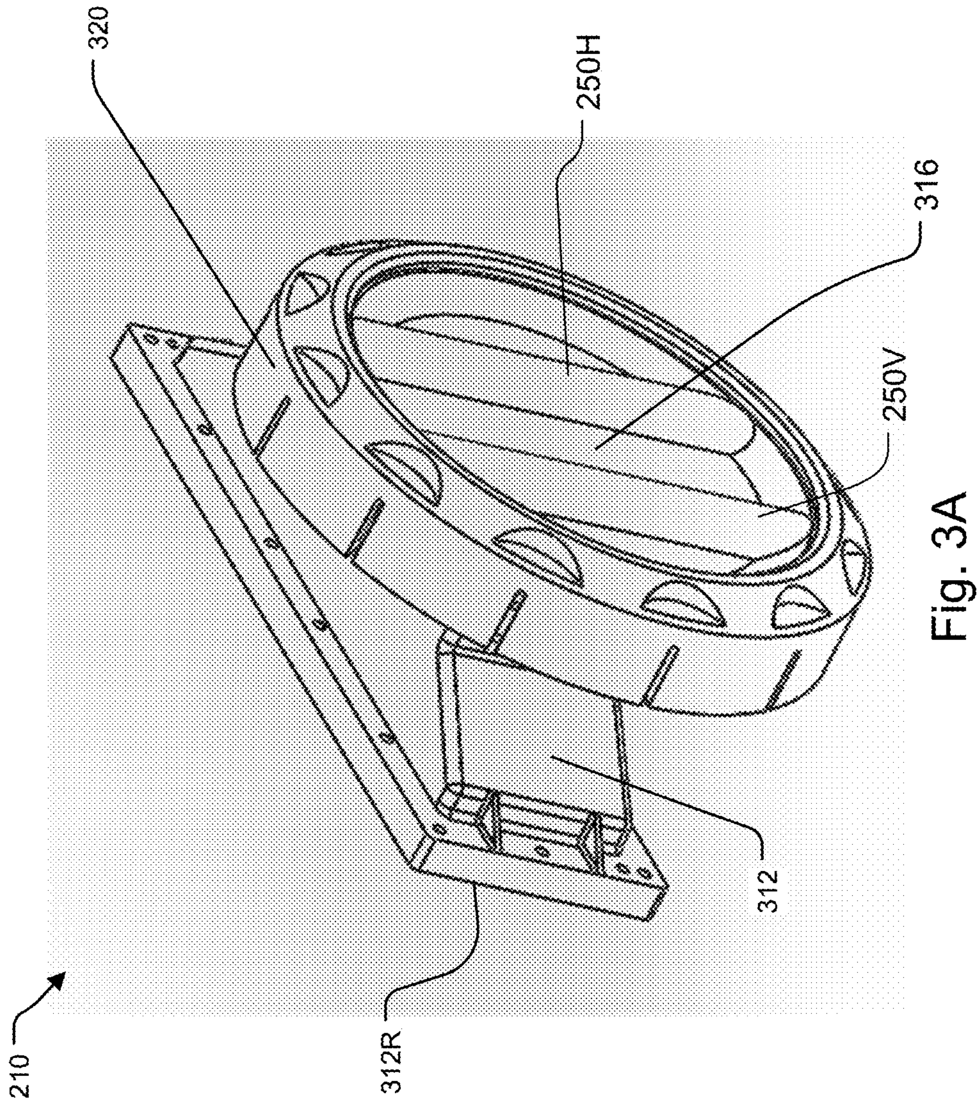
FIGS. 3A and 3B are a perspective view and a perspective exploded view of the lens and its mounting system.
Figure 3B:
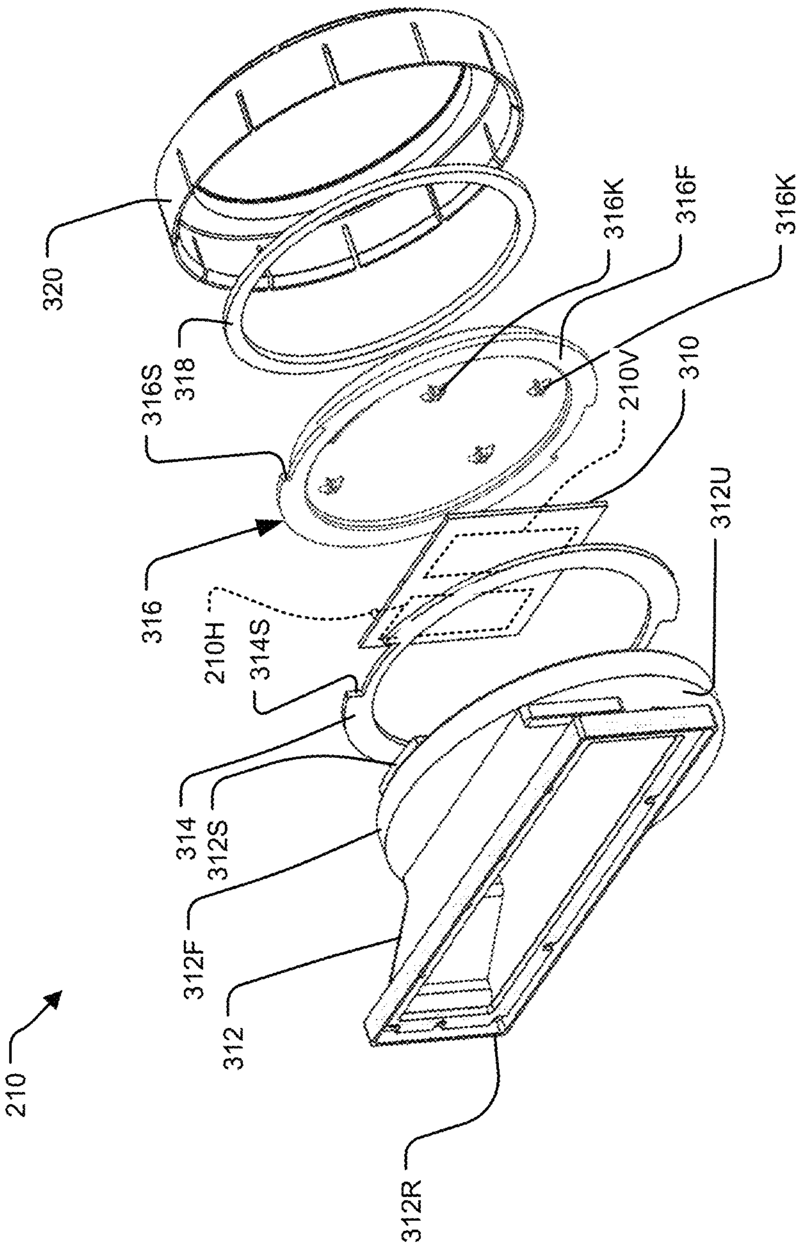

FIGS. 3A and 3B show a first embodiment of the mounting system for the lenses 250V, 250H and the H-polarization antenna 210H and the V-polarization antenna 210V of the antenna system 210.

In more detail, an antenna printed circuit board 310 is fabricated to have the four columnar radiating elements 230H, 230V for each of the H-polarization antenna 210H and the V-polarization antenna 210V. The antenna printed circuit board 310 is mounted within a center of a front face 312F of a front housing piece 312. A rear rectangular mounting face 312R of the front housing piece 312 attaches to a housing 102H of the aggregation node 102.

The outer profile of the front face 312F is generally circular but has a snap retention undercut 312U around its periphery. A rear seal 314 fits in the front face 312F. Indexing cut-outs 314S of the rear seal 314 interface with indexing shoulders 312S of the front face 312F to preserve their rotation alignment.

Both lenses 250H, 250V are formed on a common lens substrate 316. This substrate 316 has an outer flange 316F with two indexing bores 316S for mating with the indexing shoulders 312S. A set of four key bore 316K fix the rotational position of the lens substrate 316 with respect to the antenna printed circuit board 310 that has a corresponding arrangement of alignment pins 310P (see FIG. 4A). When properly rotationally aligned, the pins 310P of the board 310 are received into the bores 316S. Thus, the substrate 316 is also rotationally fixed relative to the antennas 210H, 210V on the antenna printed circuit board 310.

As shown, in the illustrated embodiment, the lenses 250H, 250V have a continuous cross section along a vertical axis such as plano-convex solid bodies projecting forward from the outer surface of the common lens substrate 316. The material of the bodies is transparent to the high frequency signals in the 10 and 300 GHz frequency range. Preferably, the refractive index is between X and Y in most embodiments to thereby form refractive lenses. Other options are cylindrical Fresnel profiles and diffractive lens.

A front gasket 318 seals against a front face of the flange 316F, and the rear gasket 314 seals against the rear face of the flange 316F. A front retaining ring 320 urges the front gasket against the flange 316F and snap fits on the snap retention undercut 312U of the front face 312F of the housing piece 312.

These gaskets may be adhered to the lens flange, the housing, or retaining ring 320, or be unconstrained within the assembly.

In one example, the two gaskets 314, 318 are different durometers, the rear gasket 314 being softer. The two durometers are used to compress both as a seal and to permit motion of the lens substrate 316 to "seat" in its proper juxtaposition to the antenna printed circuit board 310. The front gasket 318 is harder and meant to preload and maintain that lens position against the resistive force of the lower durometer rear gasket, and serve as the front environmental seal.

Figure 4B:
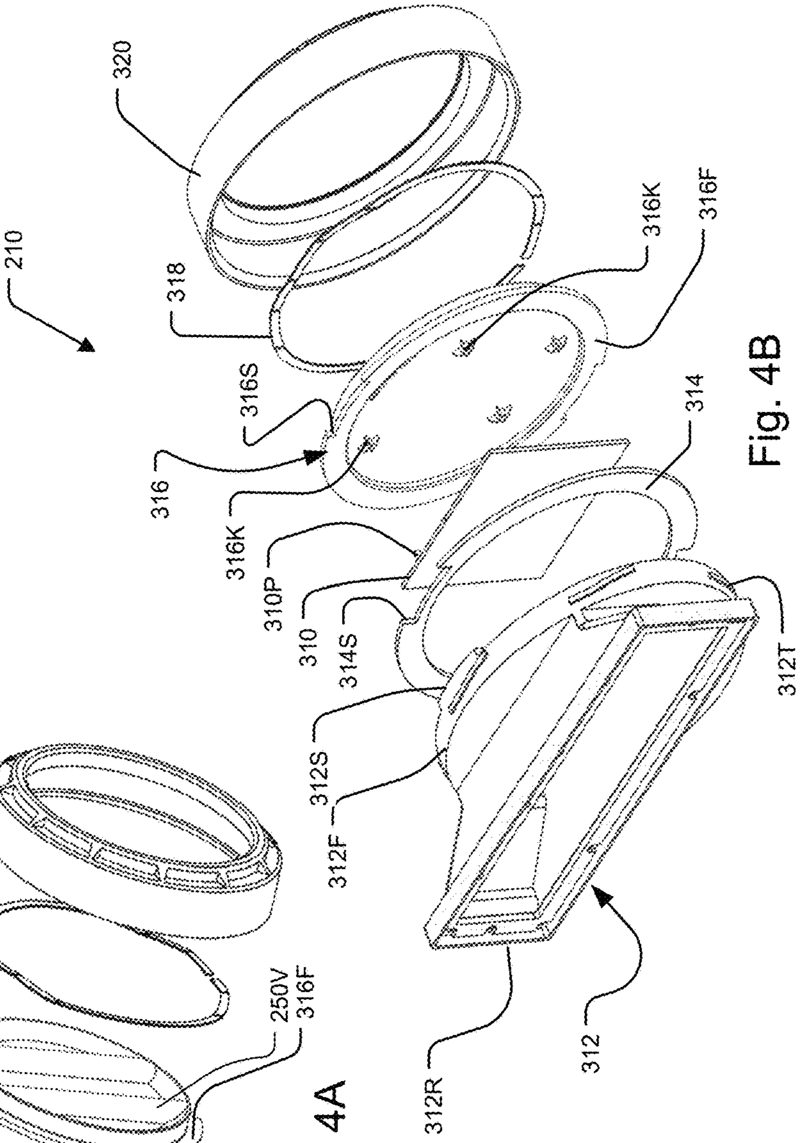
FIGS. 4A and 4B are perspective exploded views of the lens and its mounting system according to another embodiment.
Figure 4A:
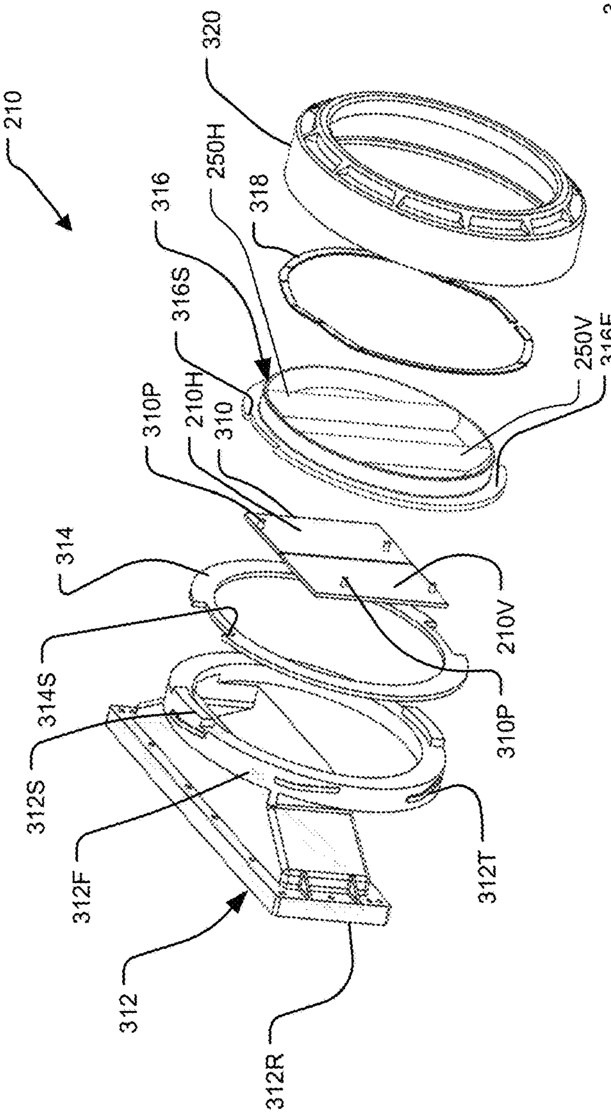

FIGS. 4A and 4B shows a second embodiment of the lens mounting system. It has a threaded retaining ring 320. Here, the front face 312F of the housing piece includes an interrupted thread 312T so that the retaining ring 320 can be attached to the housing piece 312. This urges the front gasket 318 and rear seal 314 against either side of the flange 316F.

Also shown are the pins 310P of the board 310 and their bores 316K of the substrate 316.

Figure 5B:
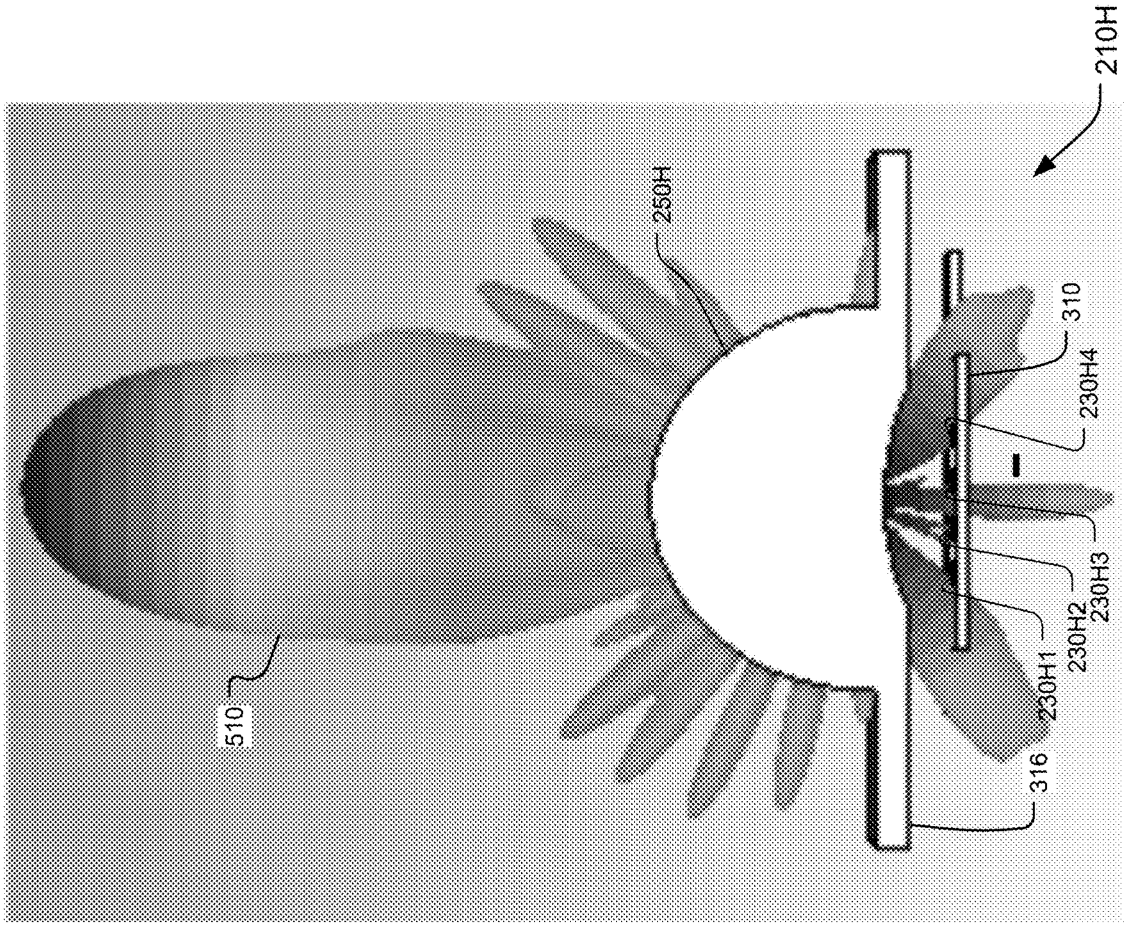
FIGS. 5B, 5C, and 5D show the relationships between the antenna and gain profile when three different lenses are used.
Figure 5A:
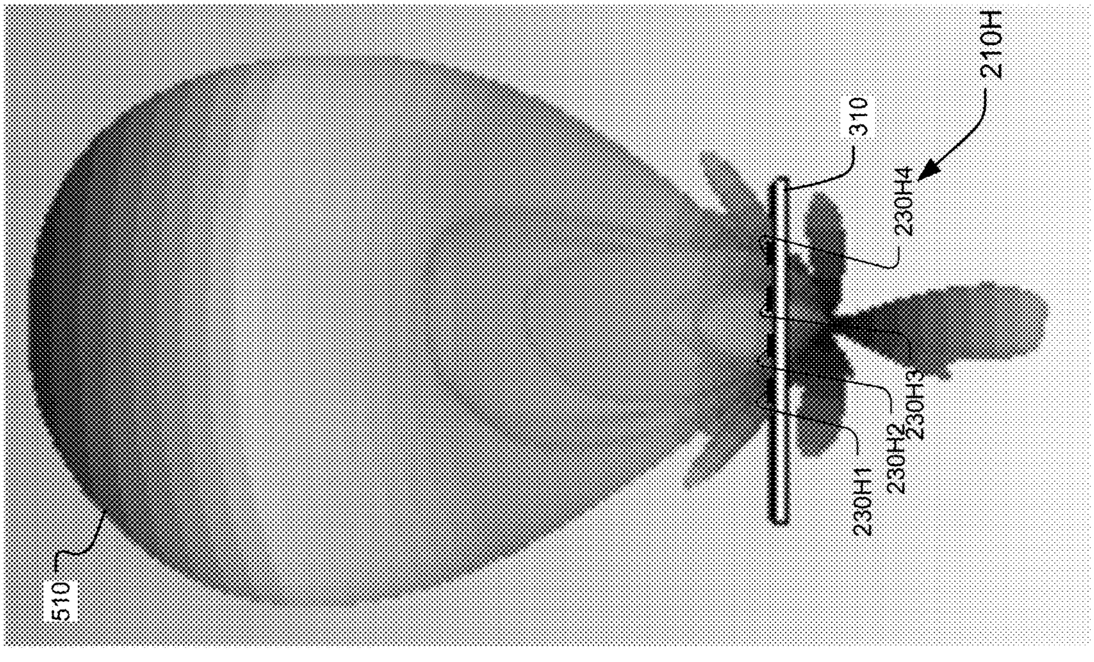
FIG. 5A shows the relationship between the antenna, gain profile when no lens is present.

FIG. 5A shows the relationship between the antenna, here the horizontal antenna 210H, and the gain profile 510 when no lens is used.

FIG. 5B shows the relationship between the antenna 210H, and the gain profile 510 when an elliptical lens 250H is used with an outer radius of 16 millimeters is used. This has the result of narrowing the single beamwidth (main lobe) and the sweep arc compared to no lens.

Figure 5C:
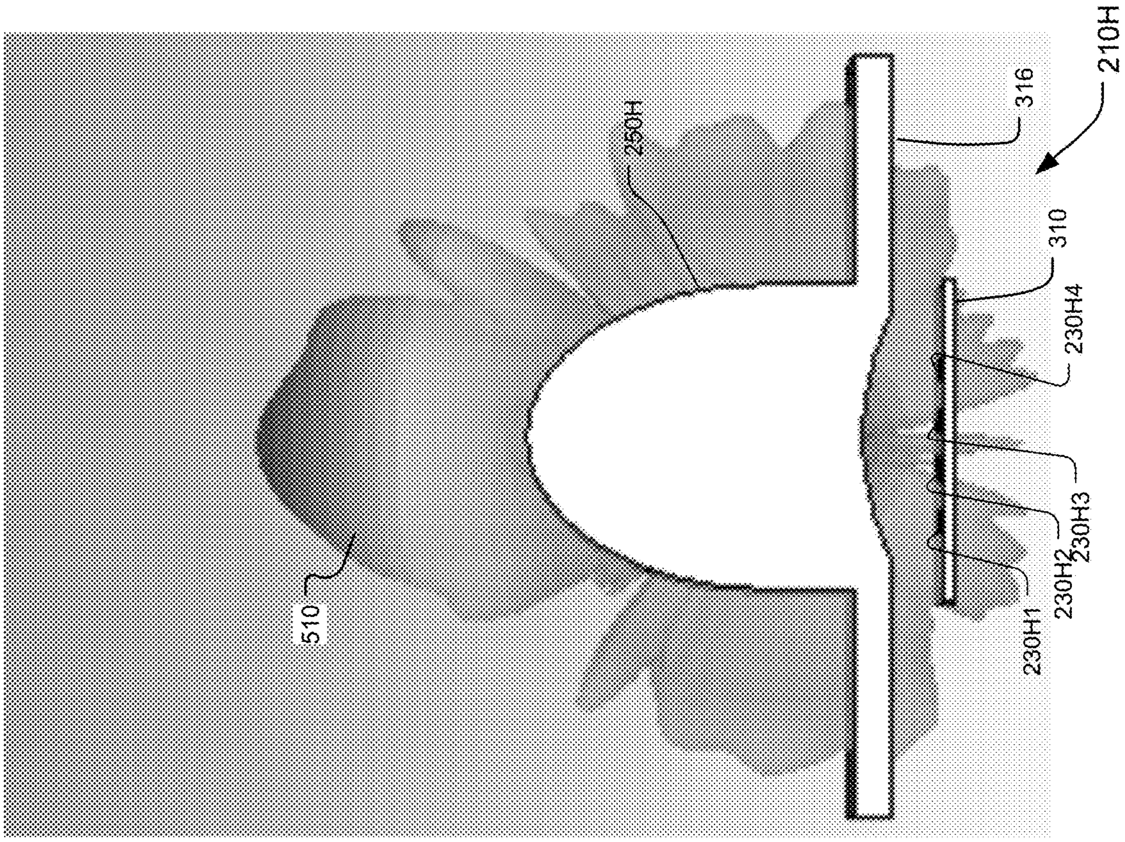

FIG. 5C shows the relationship between the antenna 210H, and the gain profile 510 when an elliptical lens 250H is used with an outer radius of 12 millimeters. This has the result of expanding the single beamwidth (main lobe) and the sweep arc compared to no lens.

Figure 5D:
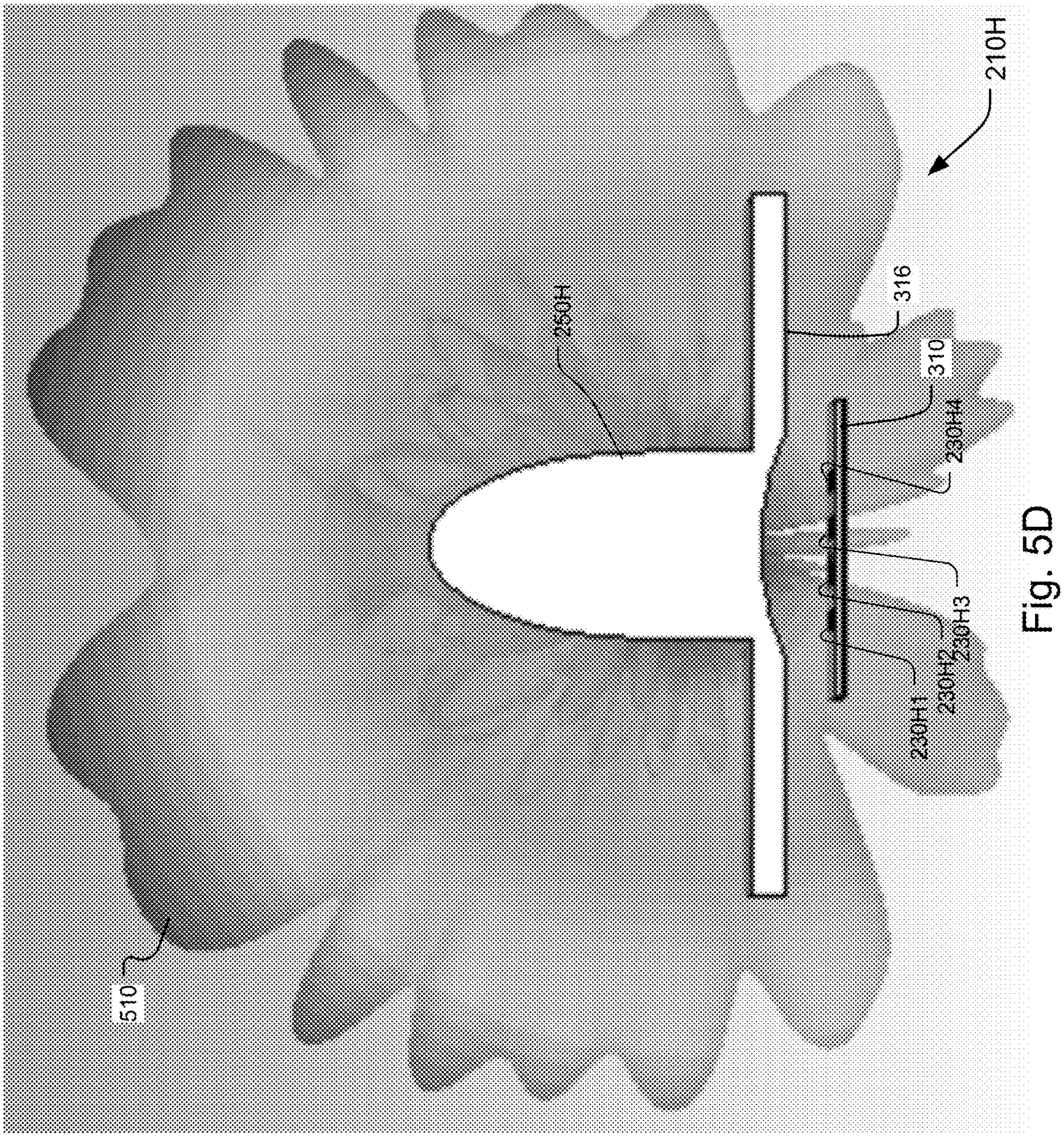

FIG. 5D shows the relationship between the antenna 210H, and the gain profile 510 when an elliptical lens 250H is used with an outer radius of 8 millimeters. This has the result of further expanding the single beamwidth (main lobe) and the sweep arc compared lens with the 12 millimeter lens.

While this invention has been particularly shown and described with references to preferred embodiments thereof, it will be understood by those skilled in the art that various changes in form and details may be made therein without departing from the scope of the invention encompassed by the appended claims.

What is claimed is:

1. An aggregation node for an access network, comprising: two phased array antennas operating at different polarizations; two changeable cylindrical lenses for the two phased array antennas to modify a sweep arc in azimuth allowing a radiation pattern to be adapted for an installation location, wherein the two changeable cylindrical lenses comprise a first changeable cylindrical lens for a first phased array of the two phased arrays antennas, a second changeable cylindrical lens for a second phased array of the two phased arrays antennas; and an alignment system for rotationally aligning the changeable cylindrical lenses to their respective phased array antennas.

2. The aggregation node as claimed in claim 1, wherein at least one of the phased array antennas comprises several columnar radiating elements.

3. The aggregation node as claimed in claim 1, wherein at least one of the changeable cylindrical lenses has a continuous cross section along a vertical axis.

4. The aggregation node as claimed in claim 1, wherein at least one of the changeable cylindrical lenses is a plano convex lens.

5. The aggregation node as claimed in claim 1, wherein at least one of the changeable cylindrical lenses is a plano concave lens.

6. The aggregation node as claimed in claim 1, further comprising an antenna and lens mounting system for mounting at least one of the changeable cylindrical lenses over the at least one of the phased array antennas.

7. The aggregation node as claimed in claim 6, wherein the antenna and lens mounting system comprises a housing piece and a retaining ring for holding the changeable cylindrical lenses over the phased array antennas.

8. The aggregation node as claimed in claim 7, further comprising at least one gasket between the housing piece and the retaining ring.

9. The aggregation node as claimed in claim 7, further comprising an antenna printed circuit board on which at least one of the phased array antennas is implemented, the antenna printed circuit board being held by the housing piece.

10. The aggregation node as claimed in claim 9, the alignment system rotationally aligning the antenna printed circuit board to the first changeable cylindrical lens.

11. A method for configuring an aggregation node for an access network, comprising: establishing wireless internet service provider handoffs to endpoint nodes with two phased array antennas comprising a first phased array antenna and a second phased array antenna, the first and second phased array antennas operating at different polarizations, wherein a first changeable cylindrical lens is for the first phased array antenna, and a second changeable cylindrical lens is for the second phased array antenna; adapting a sweep arc of the phased array antennas, the changeable cylindrical lenses associated with the phased array antennas allowing a radiation patterns to be adapted in azimuth for an installation location; and for each phased array antenna, rotationally aligning the corresponding changeable cylindrical lens to the phased array antenna.

12. The method as claimed in claim 11, wherein at least one phased array antenna comprises several columnar radiating elements.

13. The method as claimed in claim 11, wherein one of the changeable cylindrical lenses has a continuous cross section along a vertical axis.

14. The method as claimed in claim 11, wherein at least one of the changeable cylindrical lenses is at least one of: a plano convex lens, and a plano concave lens.

15. The aggregation node as claimed in claim 1, wherein both the first and second changeable cylindrical lenses are mounted on a common lens substrate.

16. The aggregation node as claimed in claim 15, further comprising a housing, wherein the common lens substrate comprises at least one indexing bore for mating with at least one indexing shoulder of the housing to preserve rotation alignment of the changeable cylindrical lenses with the phased arrays antennas.

17. The aggregation node as claimed in claim 1, wherein the alignment system is a snap-in system.

* * * * *